(12) United States Patent
Park

(10) Patent No.: US 6,223,690 B1
(45) Date of Patent: *May 1, 2001

(54) MODULAR ANIMAL HABITAT

(76) Inventor: Hong Ku Park, 203 Southcrest Dr., Huntsville, AL (US) 35802

( * ) Notice: Subject to any disclaimer, the term of this patent is extended or adjusted under 35 U.S.C. 154(b) by 0 days.

This patent is subject to a terminal disclaimer.

(21) Appl. No.: 09/392,200

(22) Filed: Sep. 8, 1999

(51) Int. Cl.$^7$ ...................................................... A01K 1/00
(52) U.S. Cl. ............................ 119/248; 119/421; 119/702
(58) Field of Search .................................... 119/248, 417, 119/421, 452, 475, 701, 702, 707

(56) References Cited

U.S. PATENT DOCUMENTS

| | | |
|---|---|---|
| D. 84,002 | 4/1931 | Smith . |
| 192,595 | 7/1877 | Palen et al. . |
| D. 231,371 | 4/1974 | Willinger et al. . |
| D. 232,036 | 7/1974 | Willinger et al. . |
| 1,576,462 | 3/1926 | Polzin . |
| 1,943,417 | 1/1934 | Bringman . |
| 2,059,927 | 11/1936 | Beck . |
| 2,512,678 | 6/1950 | Rice . |
| 3,653,357 | 4/1972 | Sheidlower et al. . |
| 3,687,110 | 8/1972 | Braunhut . |
| 3,791,346 | 2/1974 | Willinger et al. . |
| 3,903,844 | 9/1975 | Greenia . |
| 3,921,583 | 11/1975 | De Shores . |
| 3,991,715 | 11/1976 | Gibson, Jr. . |
| 3,994,262 | 11/1976 | Suchowski et al. . |
| 5,067,439 | 11/1991 | Hand . |
| 5,082,000 | 1/1992 | Picha et al. . |
| 5,083,528 | 1/1992 | Strong . |
| 5,092,269 | 3/1992 | Phillips et al. . |
| 5,186,122 | 2/1993 | Phillips et al. . |
| 5,357,903 | 10/1994 | Rivera . |
| 5,664,524 | 9/1997 | Piglia et al. . |
| 5,664,525 | 9/1997 | Phillips et al. . |
| 5,799,611 | 9/1998 | Park . |

Primary Examiner—Charles T. Jordan
Assistant Examiner—Judith A. Nelson
(74) Attorney, Agent, or Firm—Waddey & Patterson, P.C.; John C. Garvin, Jr.

(57) ABSTRACT

An animal habitat for housing animals which allows the animals to move between two or more modules or chambers. The animal habitat comprises a plurality of lower tier modules having passageways therebetween for allowing animals to move from a lower tier module to an adjacent lower tier module and a plurality of upper tier modules having passageways therebetween for allowing animals to move from one upper tier module to an adjacent upper tier module.

19 Claims, 10 Drawing Sheets

MODULAR ANIMAL HABITAT

FIELD OF THE INVENTION

This invention relates generally to a modular animal habitat, and more particularly to a modular animal habitat for housing one or more species of animals and which has passageways for allowing the animals housed therein to move horizontally between the modules making up the habitat.

BACKGROUND OF THE INVENTION

The present invention relates to a novel modular habitat for animals comprising a plurality of spaced modules for housing animals therein and allowing them to move between two or more spaced modules.

Aquariums and other animal habitats have long been used in homes, schools, offices, and the like, both for their decorative and ornamental functions, and for providing means whereby various types of animals such as fish, frogs, turtles, tadpoles, iguanas, rodents, and the like may be viewed swimming, moving, feeding and engaging in other activities which are both educational and interesting to watch. The characteristics and tendencies of specific animals can be of extreme interest and educational value as the animals grow, and when viewed at periodic intervals.

While the prior art encompasses numerous aquariums or the like having a plurality of independent or spaced tanks for housing fish, such devices have numerous defects and disadvantages which are obviated by the present invention. The following U.S. Pat. Nos. are exemplary of such prior art devices: U.S. Pat. Nos. 192,595 (Palen et al.); 1,576,462 (Polzin); 2,059,927 (Beck); 3,903,844 (Greenia); 3,921,583 (De Shores); 3,991,715 (Gibson); 5,067,439 (Hand); 5,083,528 (Strong); and 5,799,611 (Park).

Each of the Palen et al, Polzin, Beck, Greenia and Gibson patents discloses an aquarium having two spaced tanks or reservoirs and an arched shaped bridge connecting the tanks or reservoirs which allow fish to swim between the spaced tanks or reservoirs. The De Shores patent discloses an aquarium arrangement having two or more spaced tanks interconnected by one or more passageway tubes which allow fish to swim between the spaced tanks. The Strong patent discloses an aquarium comprising a plurality of spaced tanks in stepped, gradually descending, relation whereby water introduced to the uppermost tank flows therethrough and then down into and through each succeeding tank with means for causing the flow of water from one tank to the next. The inventor of the invention disclosed and claimed in the Park patent is the same as the inventor of the invention disclosed and claimed in the instant application, with the invention disclosed in the instant application being an improvement over that disclosed in the Park patent. The Park patent discloses an animal habitat which allows animals to move between two or more modules or chambers and which generally comprises a plurality of lower tier modules having passageways therebetween, and a plurality of upper tier modules having passageways therebetween. The chambers or modules disclosed in the Park patent incorporate numerous parts that must be secured to each other and are not made as single parts.

SUMMARY OF THE INVENTION

In accordance with the present invention a modular animal habitat is provided which allows animals housed therein to move between two or more modules or chambers. The modular animal habitat is adapted to be supported by a rack or support with legs that may be placed on a table or the like.

The modular animal habitat is generally comprised of a plurality of lower tier modules having passageways therebetween for allowing animals to move from a lower tier module to an adjacent lower tier module and a plurality of upper tier modules having passageways therebetween for allowing animals to move from one upper tier module to an adjacent upper tier module. However, it is to be understood that the animal habitat of the present invention could be comprised of a plurality of modules in a one-tier arrangement.

Accordingly, it is an object of the present invention to provide an improved modular animal habitat which allows animals housed therein to move from one module to one or more adjacent or contiguous modules.

It is another object of the present invention to provide an improved animal habitat having a plurality of lower tier modules and a plurality of upper tier modules and passageways for allowing animals to move horizontally or vertically between at least two adjacent or contiguous modules of a common tier of modules.

It is a further object of the present invention to provide an improved modular animal habitat which is simple and inexpensive in construction and capable of housing both aquatic and terrestrial animals.

These objects as well as other objects, advantages and features of the present invention will become more readily apparent from the following specification when taken in conjunction with the accompanying drawings.

DETAILED DESCRIPTION OF THE PREFERRED EMBODIMENTS

Figure 1:
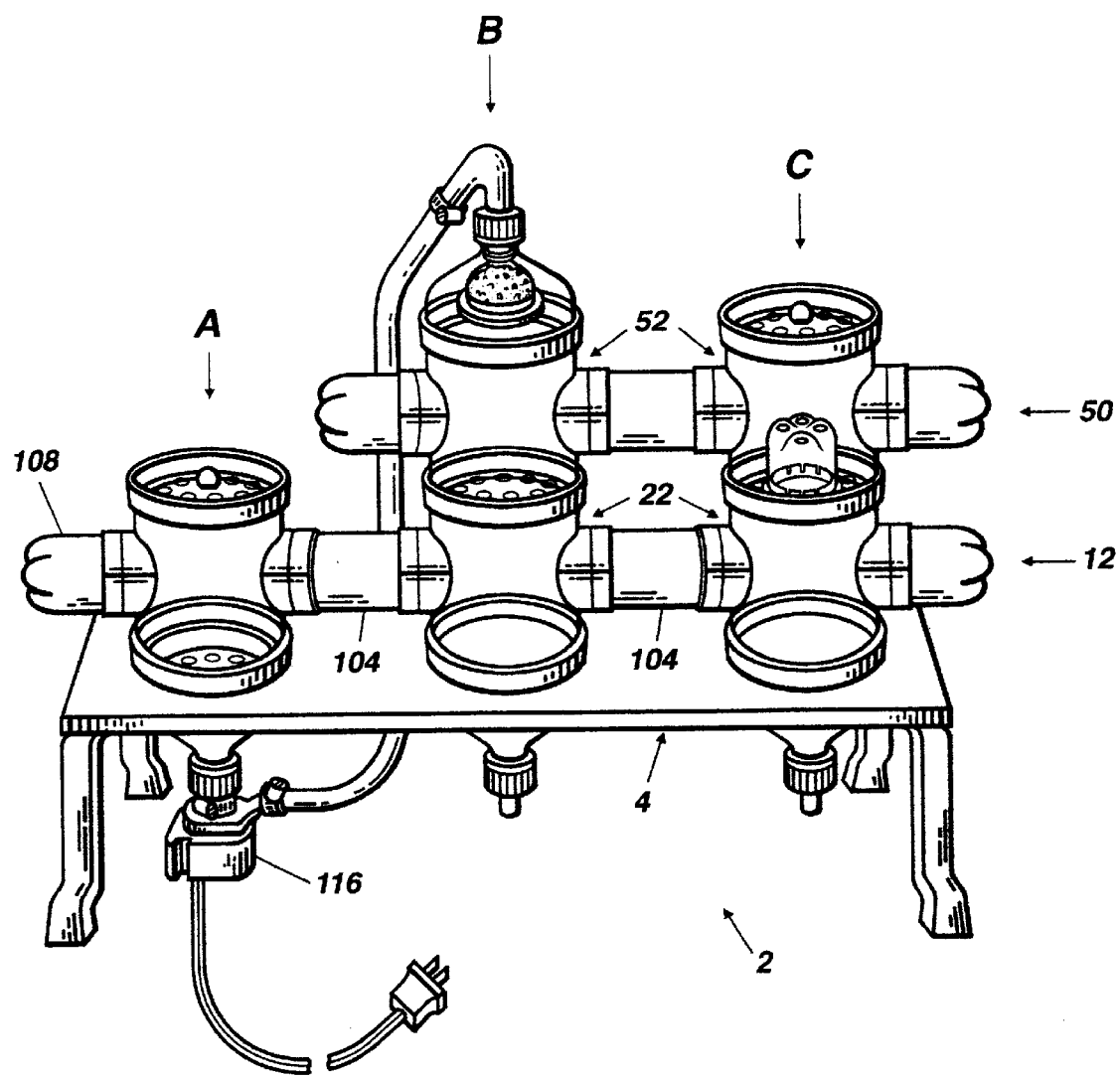
FIG. 1 is a front elevational view of the preferred embodiment of the modular animal habitat of the present invention.

Referring now to the drawings, particularly FIG. 1 thereof, reference number 2 generally refers to the preferred embodiment of the modular animal habitat of the present invention. Modular animal habitat 2 generally comprises a shelf or rack 4, a plurality of lower tier modules 12, a plurality of upper tier modules 50, as shown, arranged in three vertical columns A, B, and C, and a water circulation pump 116.

Figure 2:
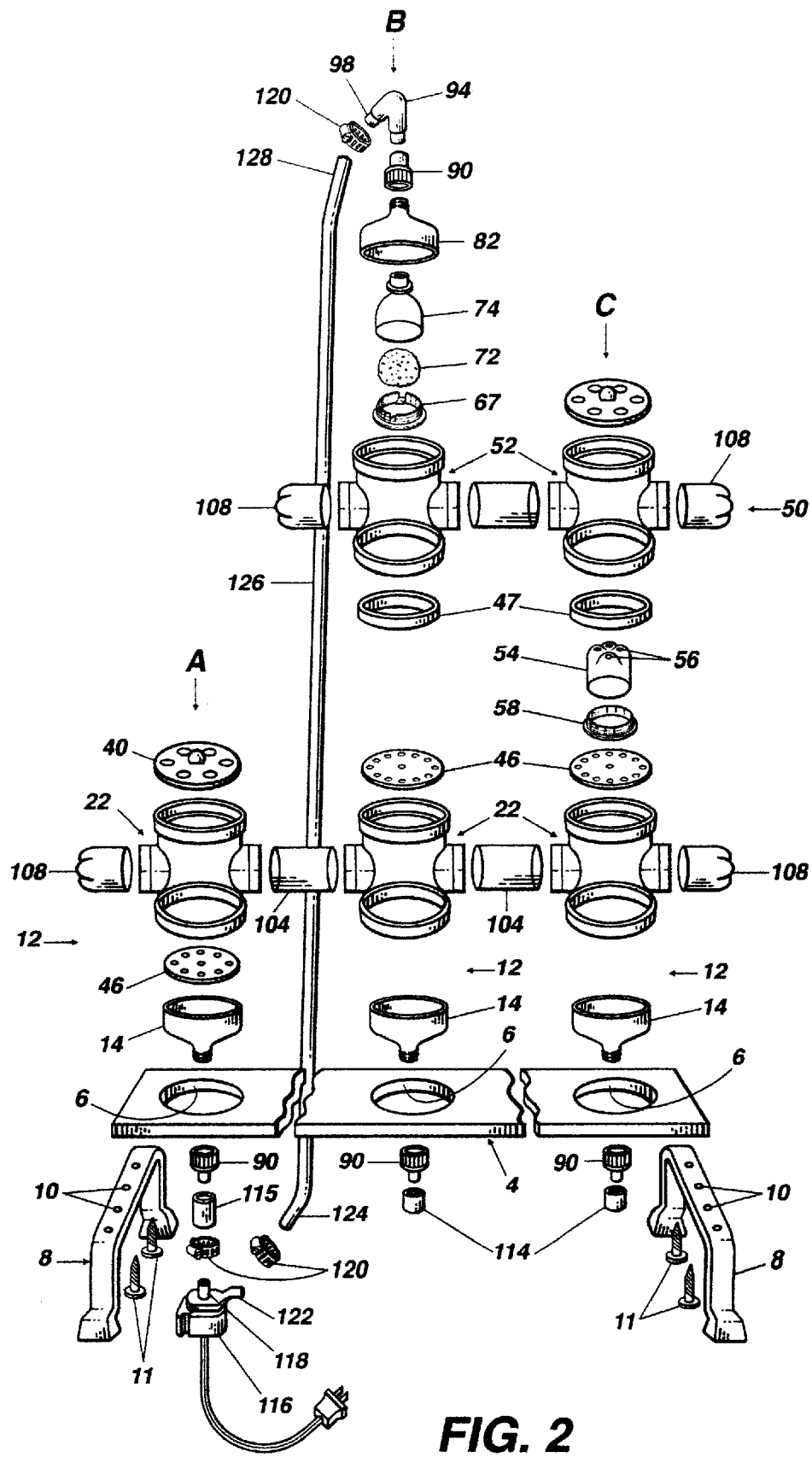
FIG. 2 is a front elevational, exploded, partially broken away view of the embodiment of the modular animal habitat of FIG. 1.
Figure 3:
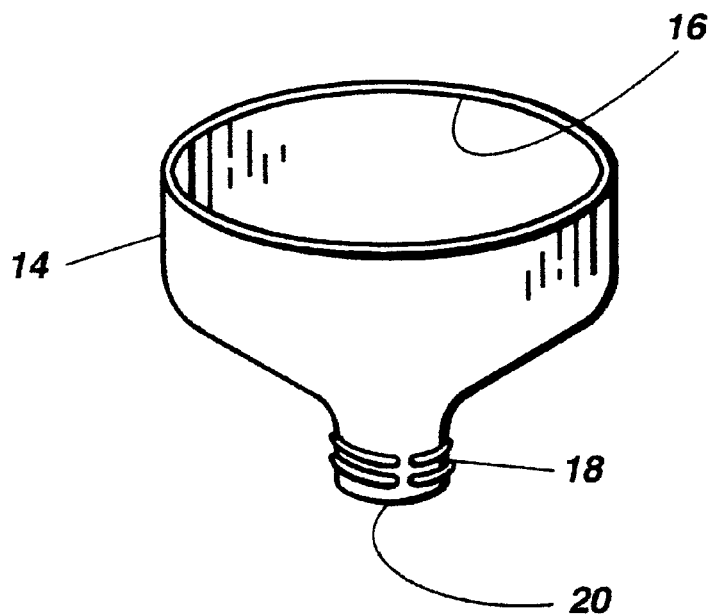
FIG. 3 is a perspective view of the lower section forming a part of a lower tier module.
Figure 4:
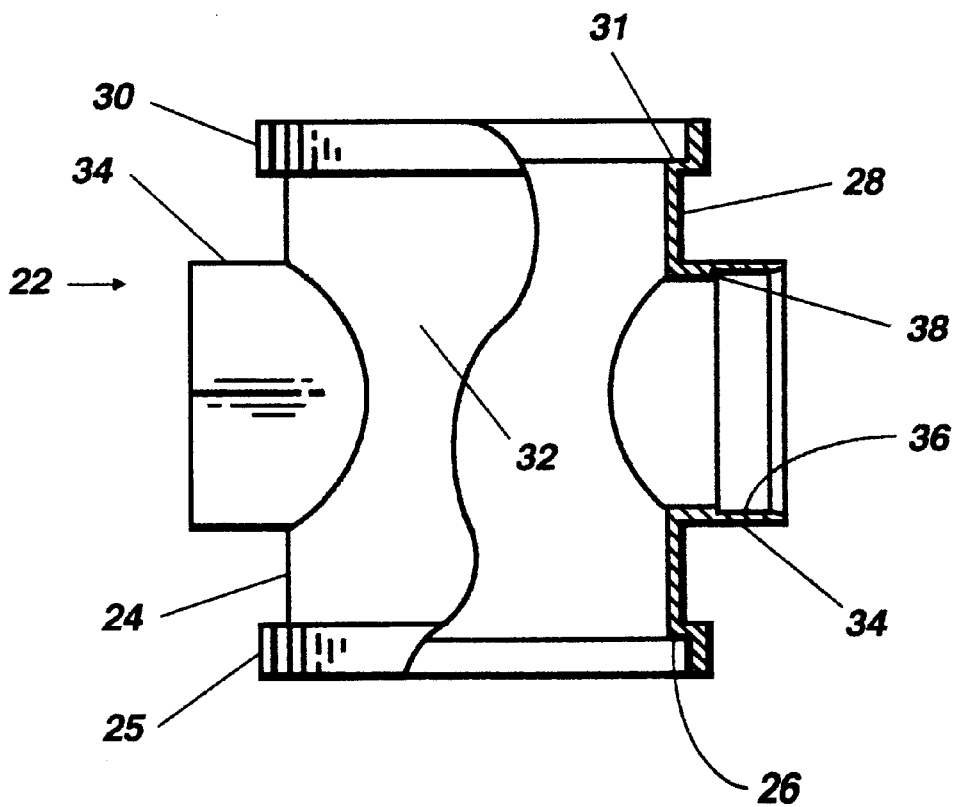
FIG. 4 is a front elevational, partially broken away, sectional, view showing the details of a unitary vertical main chamber used throughout the first embodiment of the modular animal habitat of FIG. 1.

As best seen in FIG. 2, shelf or rack 4 is generally rectangular and includes three openings 6, a pair of legs 8 with holes 10 therein, and screws 11 for passing through the holes 10 into the bottom of shelf 4 for securing legs 8 to the shelf 4.

Figure 12:
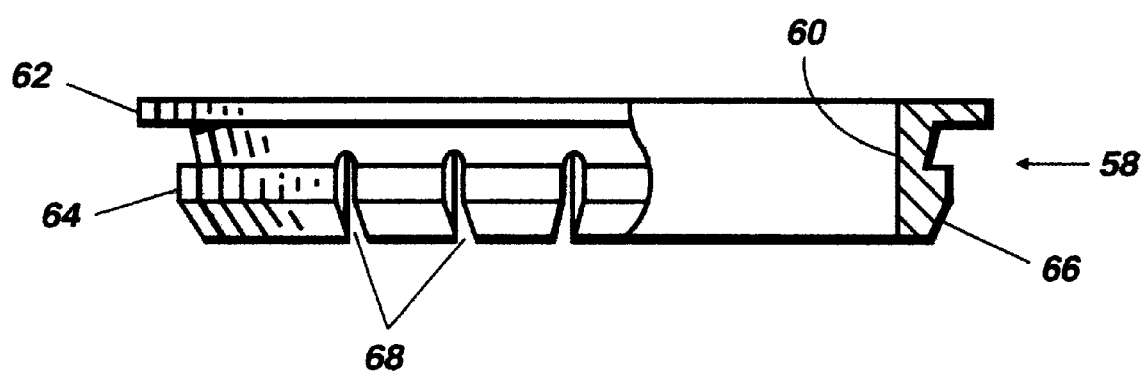
FIG. 12 is a front elevational, partially broken away and in section, view of an insert incorporated in the modular animal habitat of the present invention.
Figure 13:
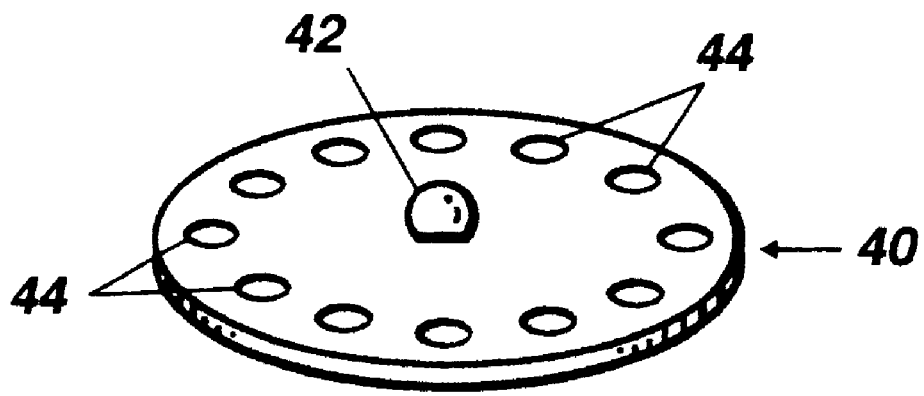
FIG. 13 is a perspective view of a cover incorporated in the preferred embodiment of the modular animal habitat.
Figure 14:
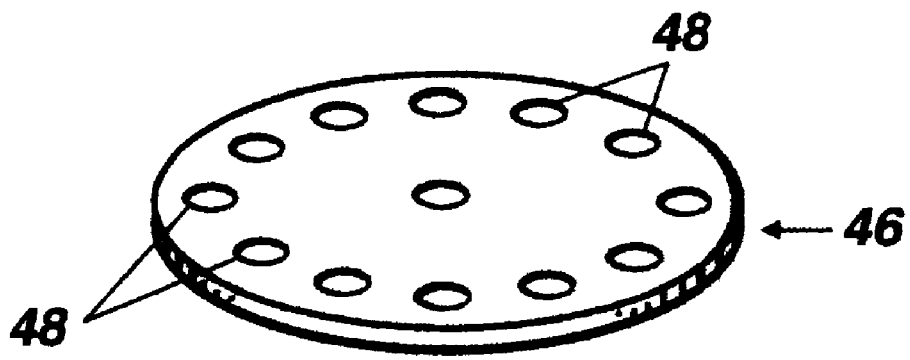
FIG. 14 is a perspective view of a drain plate incorporated in the preferred embodiment of the modular animal habitat.

As best seen in FIGS. 2–5, the lower tier module 12 in each of columns A, B, and C includes a lower section 14 having an upper opening 16 and an externally threaded lower portion 18 surrounding an opening 20; a unitary vertical main chamber 22 (FIGS. 2 and 4) having a lower portion 24; an upper portion 28; and an intermediate portion 32; the lower portion 24 has an enlarged annular collar 25 which provides an internal annular shoulder 26; and the upper portion 28 having an enlarged annular collar 30 which provides an internal annular shoulder 31, and with the intermediate portion 32 having a pair of outwardly extending horizontal elements 34 with a reduced, recessed, outer end 36 which provides an internal annular shoulder 38. Column A of modular animal habitat 2 further includes a cover 40 (FIGS. 2 and 12) having a knob 42 and a plurality of small holes 44 therein, and a drain plate 46 which rests within lower section 14 (FIG. 5) and also having a plurality of small holes 48 therein. The drain plate 46 in column A also serves to prevent fish as well as small rocks or similar objects which may have gotten in modular habitat 2 from blocking water flow into water circulation pump 116 discussed hereinbelow. The outer or lower edge of cover 40 rests upon the internal annular shoulder 31 of the upper portion 28 of the main chamber 22. Each of columns B and C of modular animal habitat 2 further includes a drain plate 46 (FIGS. 2 and 14) which rests upon the internal annular shoulder 32 of main chamber 22 and also having as plurality of very small, minute, holes 48 therein.

As best seen in FIGS. 1 and 2, no reduced main chamber 22 is in the upper tier 50 of modules 52 in column A, as shown; however, it is apparent that one or more additional vertical main chambers 22 could be stacked in column A.

Figure 7:
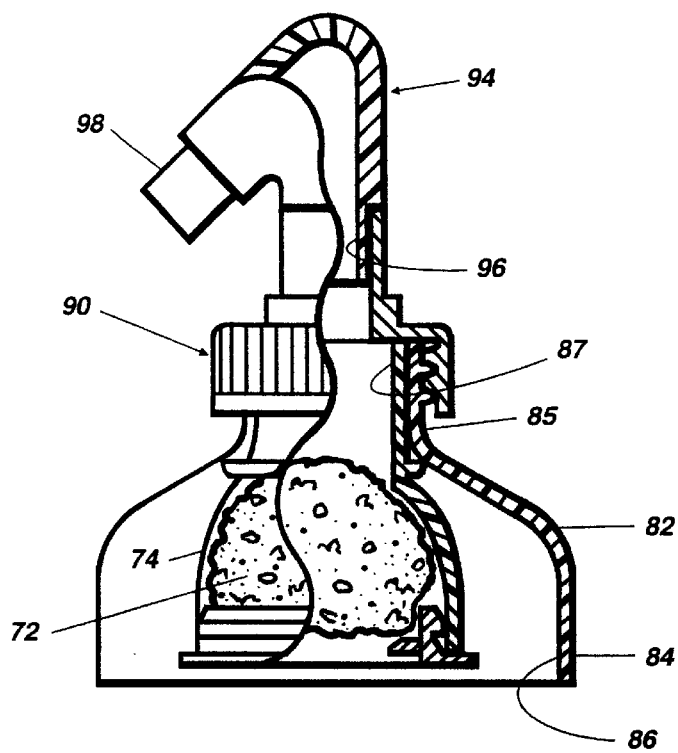
FIG. 7 is a front elevational view, partially broken away and in section, showing the details of the filter, filter supporting means, and the hose connector incorporated in the preferred embodiment of the modular animal habitat of the present invention.
Figure 8:
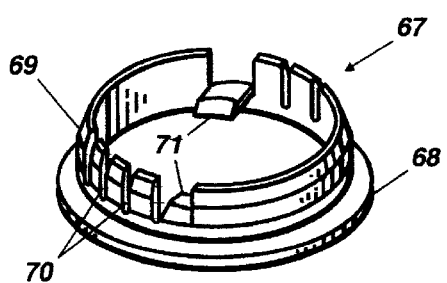
FIG. 8 is a perspective view showing the details of the filter sponge supporting means incorporated in the preferred embodiment of the modular animal habitat of the present invention.
Figure 9:
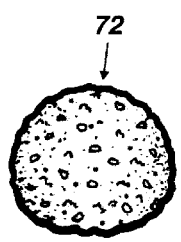
FIG. 9 is a perspective view of the sponge filter.
Figure 10:
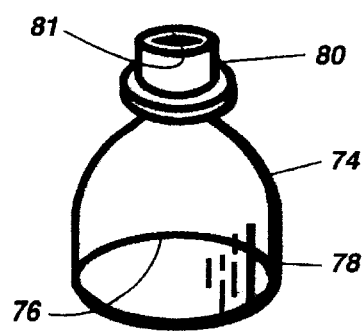
FIG. 10 is a perspective view of a filter housing dome incorporated in the preferred embodiment of the modular animal habitat.
Figure 11:
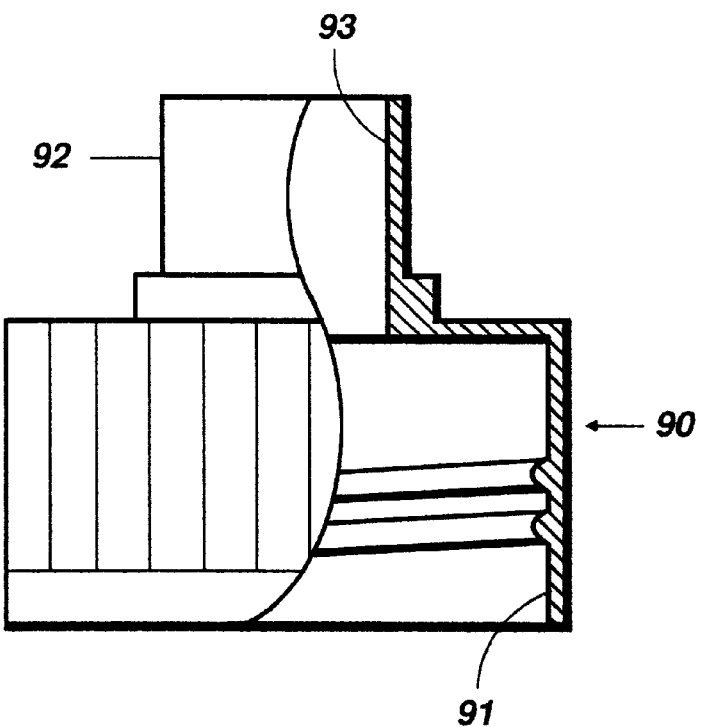
FIG. 11 is a front elevational, partially broken away, and in section, view showing the details of an internally threaded cap.

As best seen in FIG. 2, column B further includes in the upper tier 50 of modules 52 a vertical main chamber 22 of identical configuration as that included in the lower tier 12 of modules. As best seen in FIGS. 2 and 7, column B still further includes a connecting collar 47, a first insert 67 (FIGS. 2 and 8) having a first annular portion 68, a second, reduced, annular portion 69, a series of slits 70 in second, reduced, annular portion 69, and two diametrically opposed tabs 71, a filtering sponge 72 which rests upon the tabs 71, a first dome 74 (FIGS. 2, 7, and 10) having an internal opening 76 at its lower end 78 and a reduced upper end 80 defining an opening 81, a second dome 82 having a lower end 84 defining an opening 86, a reduced, threaded, upper end 85 having an opening 87 therein, an internally-threaded hollow cap 90 (FIGS. 7 and 11) having an internally threaded lower opening 91 therein, a reduced upper end 92 having an opening 93 therein, and an inverted, hollow, V-shaped connector 94 having a first reduced end 96 for frictionally engaging the internal opening 93 in hollow cap 90, and a reduced second end 98.

As best seen in FIG. 2, column C further includes in the second tier 50 of modules 52 an inverted cup-shaped member 54 having a plurality of small holes 56 in its closed bottom (not numbered) for purposes to be later explained, an insert 58 (FIG. 12) having an inner opening 60, a first annular portion 62, a second annular portion 64, and a third, tapered, annular portion 66, and a series of slits 68 cut in the second annular portion 64 and third tapered annular portion 66, a vertical main chamber 22 of identical configuration as that included in the lower tier of modules 12. The holes 56 in inverted cup-shaped member 54 allows water to flow therethrough. The top of inverted cup-shaped member 54 also serves as a resting place for frogs and similar aquatic animals that may be in modular habitat 2. Column C further includes in the upper tier 50 of modules 52 a second cover 40 having a knob 42 and a plurality of small holes 44.

The connecting collar 47 in each of columns B and C is positioned within the hollow interior of collar 30 of the vertical main chamber 22 in the lower tier 12 and the hollow interior of collar 25 of the vertical main chamber 22 in the upper tier 50 to frictionally connect the two vertical main chambers 22.

Figure 5:
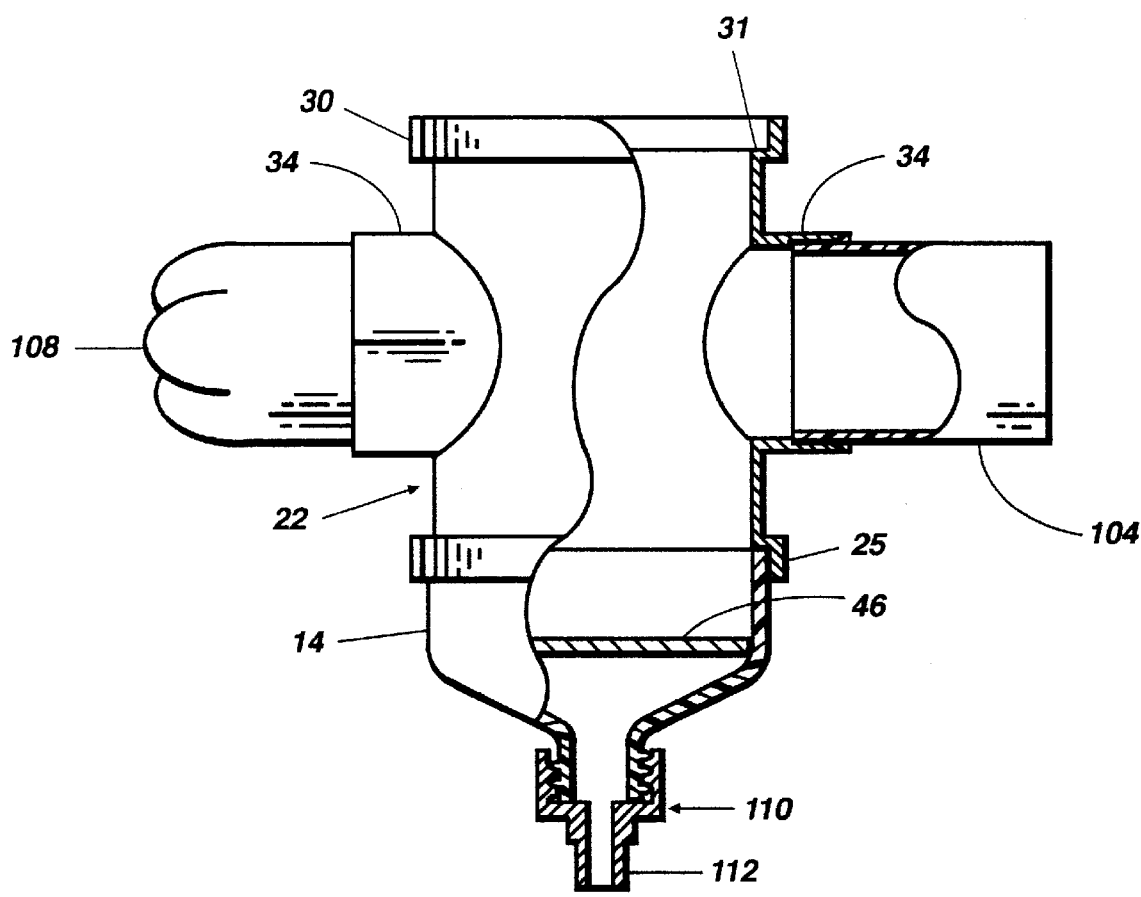
FIG. 5 is a front elevational view, partially broken away, and in section, showing some of the details of the unitary vertical main chamber and some other parts of the preferred embodiment shown in FIG. 1.
Figure 6:
FIG. 6 is a front elevational view, partially broken away, showing the details of the connecting ring.

As best seen in FIGS. 1, 2, and 5, a horizontal hollow member 104 is inserted into the reduced recessed outer end 36 of adjacent vertical main chambers 22 for frictionally connecting adjacent vertical main chambers 22. Also as best seen in FIGS. 1, 2, and 5, an end cap 108 is frictionally connected to each vertical main chamber 22 on the outer end of columns A and C. As best seen in FIGS. 2 and 5, a hollow internally-threaded cap 110 having a reduced lower end 112 is provided for being threadingly engaged to the externally threaded lower portion 18 of lower section 14 of each of the lower modules 12 in the lower tier of modules. A rubber cap 114 (FIG. 2) is provided for placing over the reduced lower end 112 of hollow threaded cap 90 in columns B and C. As best seen in FIGS. 1 and 2, a hollow tube 115 is mounted on the lower reduced end 112 of hollow internally-threaded cap 110 in column A. A water circulation pump 116 having an intake tube 118 is provided for connection to the lower end of hollow tube 115 and held in place by a clamp 120. While not shown, another clamp 120 might be used to tightly secure the upper end of hollow tube 115 to the reduced lower end 112 of hollow threaded cap 90 in column A. Water circulation pump 116 further includes an output tube 122 for connection to the first end 124 of a hose 126 by a second clamp 120. The second end 128 of hose 126 is connected and secured to the reduced end 98 of the inverted V-shaped member 94 by a third clamp 120. A water circulation pump corresponding to pump 116 shown in the drawings and described herein is available from Aquarium Systems, 8141 Tyler Boulevard, Mentor, Ohio under the trade designation MINI-JET 404, Catalog No. MN-404.

When setting up the first embodiment of the invention, as best shown in FIG. 1, water is placed in the lower tier 12 of modules such that the level of the water is approximately in the order of the uppermost portion of horizontal hollow members 104. This placement of water may be accomplished by lifting cover 40 in column A and pouring water into the lower tier module 12 in column A. In the set-up of the first embodiment of the invention, as best shown in FIG. 1, water is placed in the upper tier module 52 by lifting the cover 40 in column C and pouring water into the upper tier of modules 52 in columns B and C to a level approximately even with the uppermost portion of inverted cap-shaped member 54 in column C. The holes 48 in the drain plates 46 in columns B and C are so small that water is retained in the upper tier of modules 52 and slowly drips into the lower tier 12 of modules. In reality, there will be no water, other than an occasional drip in the space between the level of water (approximately at the uppermost portion of horizontal connecting member 104 and the drain plates 46). Aquatic animals such as fish can be placed into the water in the lower tier 12 of modules by lifting cover 40 in column A. Air-breathing animals such as frogs and tadpoles can be placed into the upper tier 50 of modules by lifting the cover 40 in column C. Animals such as frogs may sit and rest upon the upper surface of inverted cup-shaped member 54 in column C.

In operation, and as best seen in FIG. 1, water is circulated through all of the modules 12 and 52 by way of water circulation pump 116 which draws water from column A and pumps same through hollow hose 126 into the upper tier module 52 in column B through the sponge filter 72 into the upper tier modules 52 in columns B and C through the drain plates 46 and then into the lower tier modules in each of columns A, B, and C.

To change the water in the first embodiment of the invention as depicted in FIGS. 1–14 or the remove fish therefrom, the water is lowered in each of lower tier modules 12 by removing the second dome 82 from module 52 in column B, removing filter sponge 72 and drain plate 46 from column B, removing inverted cup-shaped member 54 and drain plate 46 from column C, and then lowering the second dome 82 with the hose 126 attached thereto to a level below pump 116, at which time water will flow totally from the lower tier modules 12 in columns A, B, and C to a level approximately in alignment with the bottom of each horizontal, hollow connection member 104; at which time aquatic animals such as fish, housed in the lower tier modules 12 are located in lower section 14 in each of columns A, B, and C. Aquatic animals such as fish can be removed from the lower tier modules 12 in columns B and C by removing threaded caps 90 and letting the aquatic animals to escape with the water which will flow from such lower tier modules 12.

Figure 15:
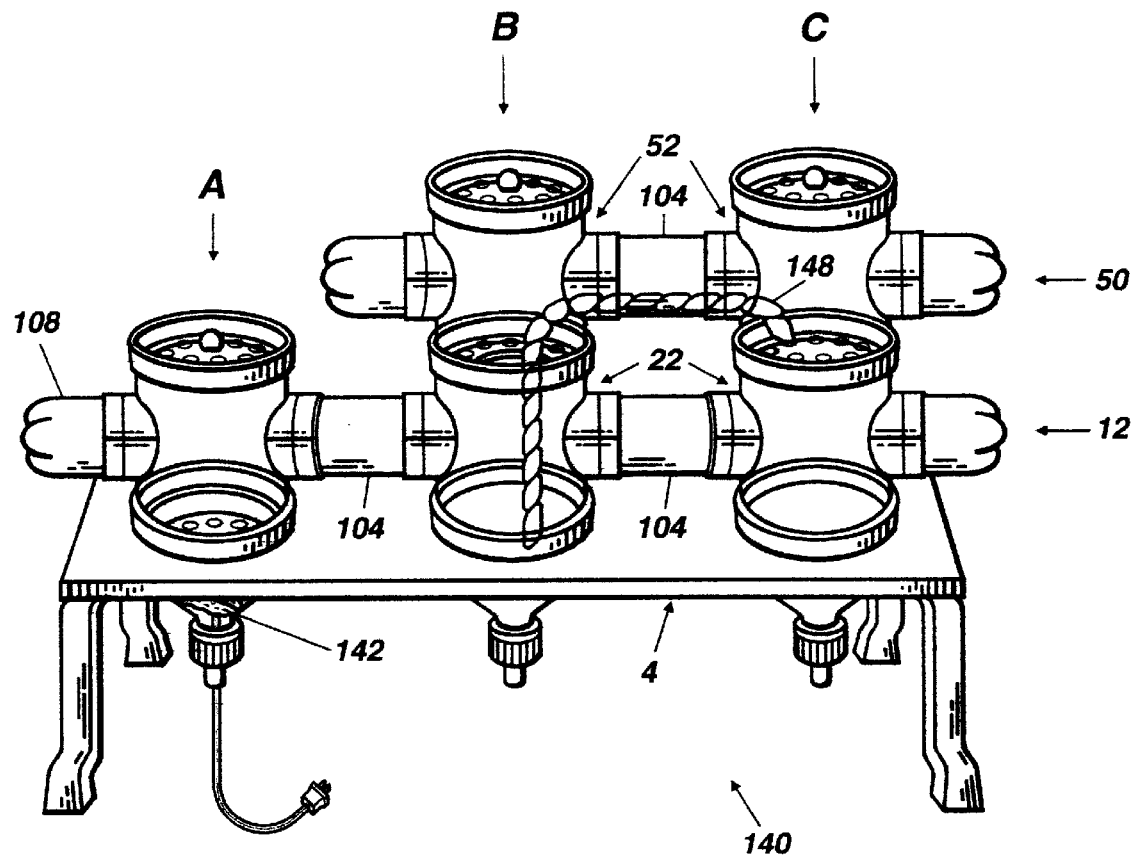
FIG. 15 is a front elevational view of a second embodiment of the modular animal habitat of the present invention.
Figure 16:
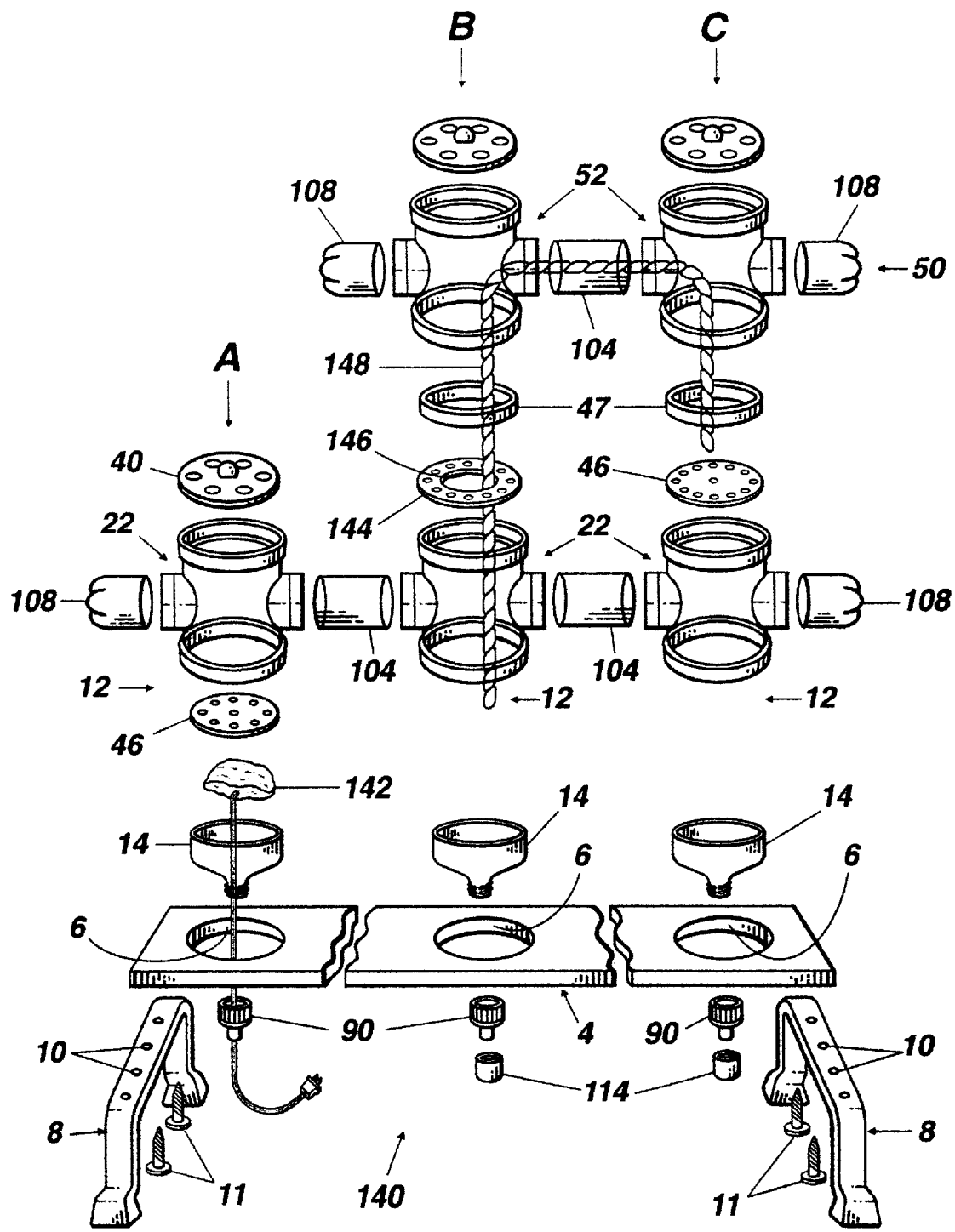
FIG. 16 is a front elevational, partially broken away, exploded, view of the second embodiment of the modular animal habitat as depicted in FIG. 15.
Figure 17:
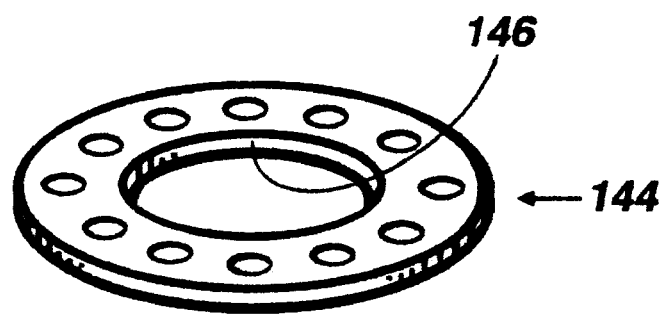
FIG. 17 is a perspective view of a collar used in the second embodiment of the modular animal habitat as depicted in FIGS. 15 and 16.

The second embodiment of the animal habitat is depicted in FIGS. 15–17 and is generally designated with the reference numeral 140 with many of the parts being identical to and identified with the same reference numerals as are the parts in the first embodiment. One of the primary differences in the two embodiments of the present invention reside in the fact that both aquatic (water breathing) and terrestrial (air-breathing) animals may be housed in the first embodiment whereas only terrestrial animals are housed in the second embodiment.

Referring now to FIGS. 16 and 17, modular animal habitat 140 generally comprises a shelf or rack 4, a plurality of lower modules 12, a plurality of upper tier modules 50, as shown, arranged in three vertical columns A, B, and C.

In the second embodiment of the invention, the structures of the shelf or rack 4, the lower section 14 of lower tier modules 12, the unitary vertical chambers 22 in both the lower tier and upper tier 12 and 50, the covers 40, the connecting collar 47, the horizontal connecting members 104 and the end caps 108 are identical to those of the first embodiment. In the second embodiment, as best shown in FIG. 16, an electric hot rock 142 is placed within the lower section 14 in column A just below the drain plate 46. A hot rock 142 is used in the second embodiment to provide a suitable warm temperature for tropical small animals such as iguanas and snakes and possibly for hatching eggs. While a hot rock 142 is shown only in column A, it is apparent that such a hot rock 142 could be placed in any or all of columns A, B, and C. An electric hot rock corresponding to electric hot rock 142 shown in the drawings and described herein is available from Zoo Med Laboratories, Inc., 3090 McMillan Road, San Luis Obispo, Calif. 93401, e.g., item numbers RH-1, RH-2, or RH-3. In column B of the second embodiment, an insert ring 144 (FIG. 17) with a large central opening 146 rests on internal annular shoulder 31 of the vertical main chamber 22. In the second embodiment, as best shown in FIGS. 15 and 16, a rope 148 extends from the upper tier module 50 in column C through the horizontal connecting member 104 and down through the large central opening 146 in insert ring 144 in column B to a point substantially level with the upper opening 16 in the lower section 14. The purpose of the rope 148 is to allow animals to exercise and move between tiers of modules. While not shown, it is apparent that one or both ends of rope 148 could be anchored or secured to an adjacent part.

While the above description constitutes preferred embodiments of the present invention, it will be appreciated that the invention is susceptible to modification, variation and change without departing from the proper scope and fair meaning of the accompanying claims. For examples, the present invention might consist of only one tier of modules or might consist of a different plurality number of columns other than three, and the covers or domes might be eliminated. As is readily apparent, animals housed within the habitat might lay eggs and hatch babies within the habitat. As is further readily apparent, many of the parts might be connected by adhesives rather than being frictionally fit.

I claim:

1. A modular habitat for housing animals, said habitat comprising:

a plurality of horizontally and adjacently disposed animal housings, each said animal housing including a unitary chamber for receiving animals and including two members integral therewith and extending therefrom;

passage means respectively connected between adjacent said chambers of said animal housings, said passage means includes two of said members extending from said unitary chamber, and a tubular member secured to said two members extending from said unitary chambers to form a passageway between said adjacent chambers; and support means for supporting said animal housings.

2. The modular habitat as in claim 1 wherein each said chamber is a water receiving chamber and wherein the animals housed therein are of the aquatic type and further including means for causing the water to continuously flow through said chambers.

3. The modular habitat as in claim 2 wherein said means for causing water to continuously flow through said chambers also removes water from said chambers while retaining some water in at least one of said chambers for the aquatic animals when fresh water is to be added to said chambers.

4. The modular habitat of claim 3 further including means for filtering said water and being positioned within one of said plurality of animal housings.

5. The modular habitat of claim 1 wherein the animals housed therein are of the terrestrial type.

6. The modular habitat of claim 5 further including rope means between at least two of said chambers for allowing the animals to exercise and move between at least two said horizontally disposed animal housings.

7. A modular habitat for housing animals, said habitat comprising:

a first tier of a plurality of horizontally and adjacently disposed animal housings, each said animal housing having a unitary chamber therein which includes two members integral therewith and extending therefrom;

at least a second tier of a second plurality of horizontally and adjacently disposed animal housings, each said animal housing having a unitary chamber therein which includes two members integral therewith and extending therefrom;

first passage means respectively connected between said chambers of said first tier of animal housings;

second passage means respectively connected between said chambers of said second tier of animal housings;

means for supportingly connecting selected ones of said first tier of said animal housings with selected ones of said at least a second tier of animals housings; and support means for supporting said first tier of animal housings.

8. The modular habitat as in claim 7 wherein each said animal housing includes a cylindrical body having a chamber for receiving said animals therein.

9. The modular habitat as in claim 7 wherein said first passage means includes two of said members which are integral with and extend from said chambers, and a second tubular member secured between adjacent said members extending from said unitary chambers to form a passageway between said adjacent chambers.

10. The modular habitat as in claim 9 wherein said second passage means includes two of said members integral with and which extend from said chambers, and a tubular member secured between adjacent said members extending from said unitary chambers to form a passageway between said adjacent chambers.

11. The modular habitat as in claim 10 wherein each said chamber of said housings in said first tier is a water receiving chamber and wherein the animals housed therein are of the aquatic type and further including means for causing the water to continuously flow through said chambers.

12. The modular habitat as in claim 11 wherein said means for causing water to continuously flow through said chambers also removes water from said chambers of said housings in said first tier while retaining some water in at least one of said chambers of said housings in said first tier for the aquatic animals when fresh water is to be added to said chambers.

13. The modular habitat as in claim 12 wherein at least one of said housings of said at least second tier of housings further includes a releasably attached cover and said means for causing water to flow through and being removed from said chambers of said housings in said first tier includes a hose having first and second ends, said first end being attached to said releasably attached cover and said second end being in communication with one of said chambers in said first tier of housings.

14. The modular habitat of claim 13 further including means for filtering said water and being positioned within one of said unitary chambers in said at least second tier of animal housings.

15. The modular habitat of claim 10 wherein said animals housed therein are of the terrestrial type.

16. The modular habitat of claim 15 further including rope means between said at least second tier and said first tier for allowing the animals to exercise and move between said at least second tier and said first tier.

17. The modular habitat of claim 16 further including an electric hot rock located within at least one of said housings in said first tier.

18. A modular habitat for housing animals, said habitat comprising:

a plurality of lower tier modules arranged generally horizontally and adjacent each other, each lower tier module including a lower section, a vertically extending unitary main chamber including two members integral therewith and extending horizontally therefrom, and means for securing each said lower section to a respective said unitary main chamber;

means for connecting each said unitary main chamber of adjacent said lower tier modules for providing a passageway between said adjacent lower tier modules for allowing animals housed therein to move generally laterally between said lower tier modules;

a plurality of upper tier modules arranged generally horizontally and adjacent to each other, each upper tier module including a vertically extending unitary main chamber including two members integral therewith and means for securing said unitary main chamber of a selected one of said lower tier modules to a selected one of said upper tier modules;

means for connecting at least two of said unitary main chambers of said upper tier modules for providing a passageway between said at least two unitary main chambers of said upper tier modules for allowing animals housed therein to move generally laterally between said at least two unitary main chambers of said upper tier modules; and means for supporting said lower tier modules;

at least one of said unitary main chambers of said upper tier modules including filter means associated therewith;

at least one of said unitary main chambers of said upper tier including a cover associated therewith, said cover including a number of openings therein.

19. The modular habitat of claim 18 wherein each of said unitary main chambers of each said lower tier module is a water receiving chamber and wherein the animals housed therein are of the aquatic type and further including means for causing water to continuously flow through said filter means and said unitary chambers.

* * * * *